Dec. 30, 1958     W. B. EWING     2,866,353
MOTION TRANSLATING DEVICES
Filed Sept. 9, 1952     4 Sheets-Sheet 1
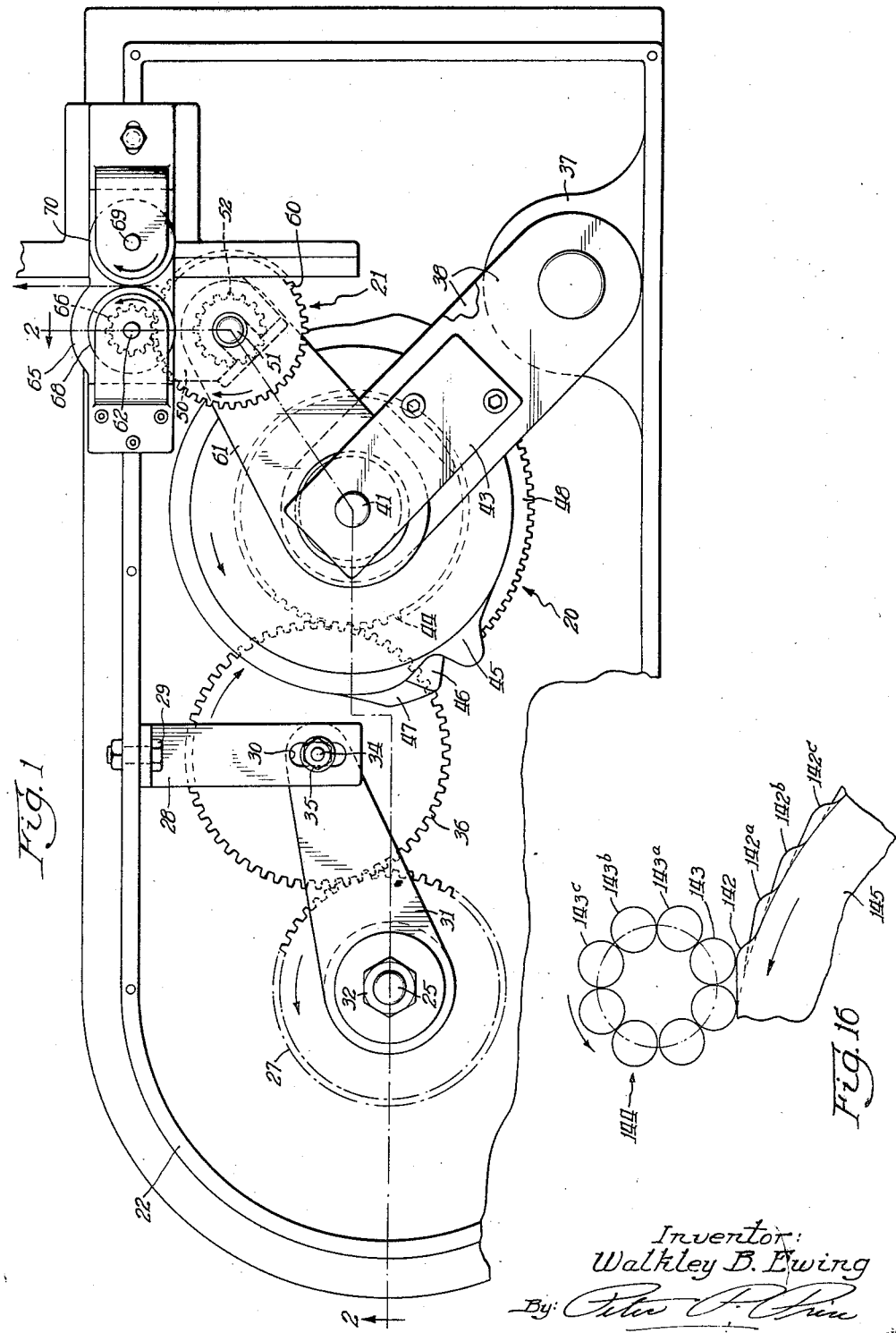
Inventor:
Walkley B. Ewing Dec. 30, 1958 W. B. EWING 2,866,353
MOTION TRANSLATING DEVICES
Filed Sept. 9, 1952 4 Sheets-Sheet 2
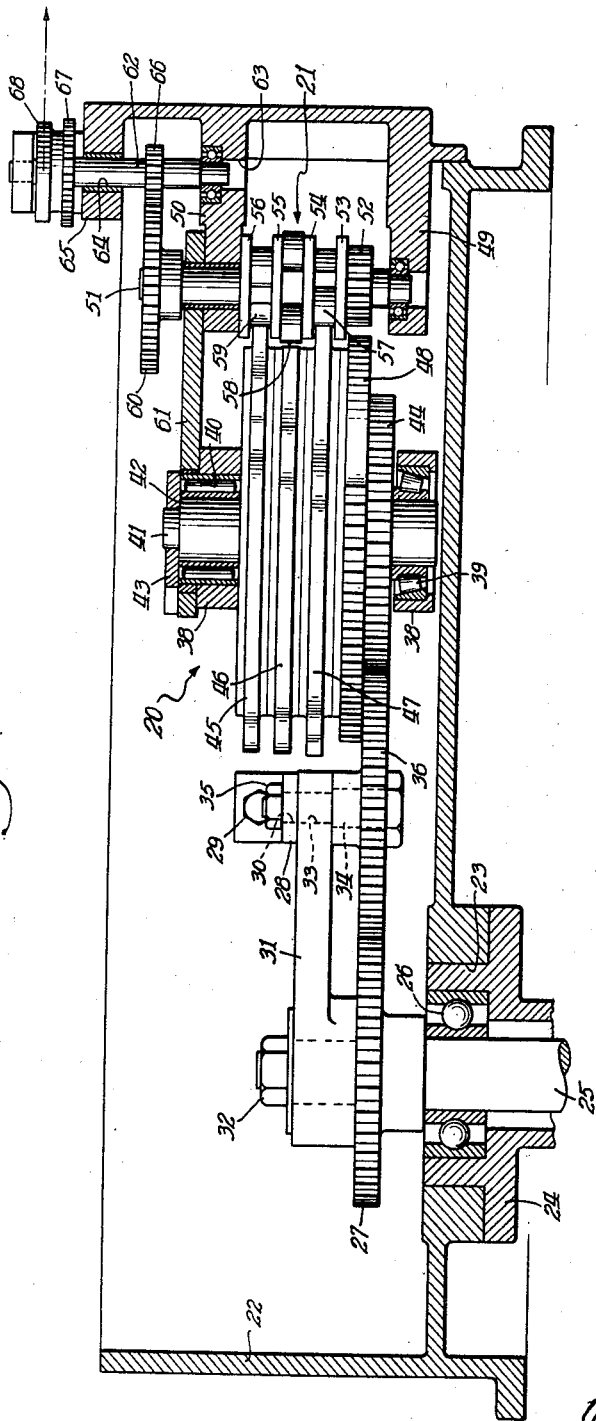
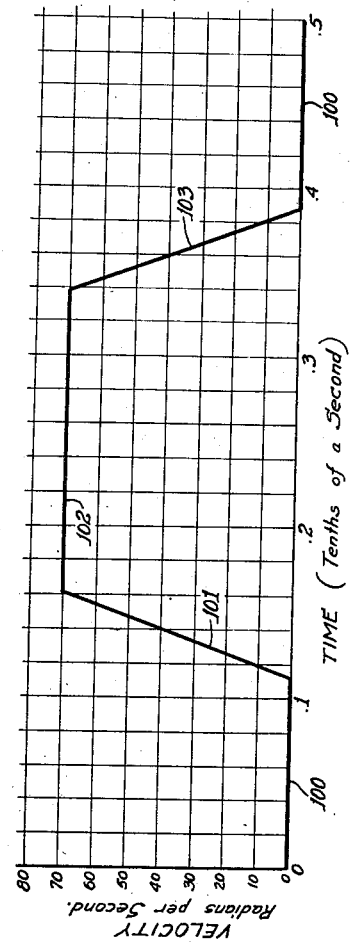
Inventor:
Walkley B. Ewing
By: *[signature]*
Atty.

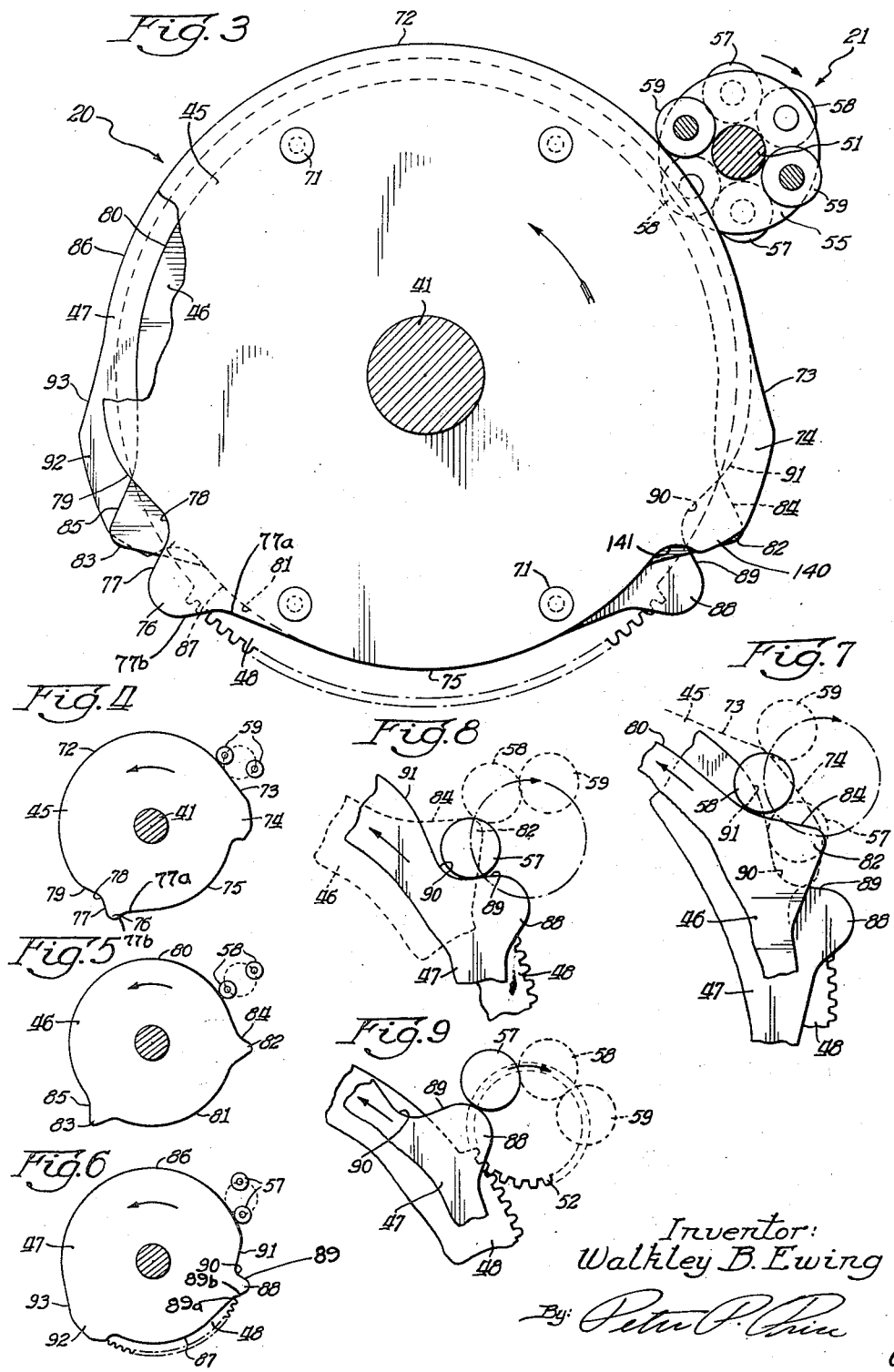

Dec. 30, 1958 W. B. EWING 2,866,353
MOTION TRANSLATING DEVICES
Filed Sept. 9, 1952 4 Sheets—Sheet 4

Inventor:
Walkley B. Ewing

United States Patent Office 2,866,353
Patented Dec. 30, 1958

2,866,353

MOTION TRANSLATING DEVICES

Walkley B. Ewing, Grand Rapids, Mich., assignor to Ewing Development Company, Grand Rapids, Mich., a corporation of Michigan Application September 9, 1952, Serial No. 308,664

15 Claims. (Cl. 74—437)

The present invention relates generally to motion transmitting devices and more particularly to motion transmitting devices for converting uniform rotary motion to intermittent or irregular velocity rotary motion.

The principal object of the present invention is to provide a device for imparting, from a rotary driving element rotating in a constant direction, to a rotary driven element non-reciprocating, positively controlled, rotary motion in either direction with selected velocities and rates of positive and negative acceleration.

Another object of the present invention is to provide a motion transmitting device for driving a rotary driven element intermittently through a precise angular distance in an arbitrarily selected portion of the complete cycle upon each intermittent operation thereof. Accordingly, the present invention finds particular utility when applied to any apparatus, in connection with which, it is desired to intermittently feed, in a specific portion of the cycle of operation, precise lengths of strip material, such as the louver wires used in screen weaving machines of the general type disclosed in W. B. Ewing Patent No. 2,223,317.

In the manufacture of screen material of the type shown in said patent conventional machines provide a choice between speed in operation and accuracy in determination of the length of the louver fed by the machine. To obtain one of these objectives the other has always had to be sacrificed. My invention makes both possible simultaneously, resulting in appreciable manufacturing economies. Further, my invention is capable of accomplishing its purpose even though the stock be heavy and thus characterized by substantial inertia.

A further object of the present invention is to provide a device for gradually accelerating a rotatable element from a locked stationary condition up to a predetermined rotational velocity, driving the element for a predetermined interval at said predetermined rotational velocity, and then gradually de-accelerating the element down to a stationary condition and locking it in this condition for a predetermined interval.

Another object of this invention is to provide translation of rotary motion of a driver to intermittent rotary motion in a driven member completely independent of any prescribed portion of a full cycle of the driver. Thus, it is designed to overcome the limitations inherent in a Geneva movement.

Another object of the invention is to provide a device for accelerating a rotatable driven element, having substantial mass, from a stationary condition, in a manner such that there will be no abrupt velocity changes of a magnitude which would cause shock to the mechanism.

Another object of the invention is to provide a device for deaccelerating a rotatable driven mechanism, having substantial mass, so that velocity changes will not be so abrupt as to cause undue shock or strain on the mechanism.

A more specific object of the invention is to provide a motion transmitting device comprising driving and driven elements where the driving element is provided with a locking sector cooperable with the driven element to hold it stationary during a portion of each revolution of the driving element and with a driving sector cooperable with the driven element to drive it through a precise predetermined angular distance during each revolution of the driving element.

In connection with the last preceding object of the invention, a further and more detailed object is to provide a motion transmitting device having a driving element comprising a gear sector and a plurality of cams each respectively provided with accelerating and retarding apices and a driven element comprising a gear intermittently cooperable with the gear sector to cause the driven element to be intermittently driven at a substantially constant driving ratio and cam followers respectively cooperable with said cams for gradually accelerating the driven element just prior to the cooperation of the gear sector and gear and gradually deaccelerating the driven element immediately after the cooperation of the gear sector and gear.

A further object of the invention is to provide a motion transmitting device comprising a driving element having a plurality of cams provided with angularly spaced accelerating apices and a driven element having a plurality of angularly spaced cam followers respectively adapted to cooperate with the apices, the slopes of successive ones of the apices being progressively steeper for effecting acceleration of the driven element upon rotation of the driving element.

Another object of the invention is to provide a motion transmitting device comprising a driving element having a plurality of cams provided with angularly spaced retarding apices and a driven element having a plurality of angularly spaced followers respectively adapted to cooperate with the apices, the slopes of successive ones of the apices being progressively less steep for effecting deacceleration of the driven element upon rotation of the driving element.

The motion transmitting device disclosed herein is particularly advantageous when used for driving feed rollers for intermittently advancing lengths of strip material. Due to the cooperation between the driving cams and driven followers, the feed rollers are accelerated and de-accelerated sufficiently gradually to prevent undue shock, stresses and strains even though the feed rollers and the mechanism associated therewith may have considerable mass. Also, the angle through which the feed rollers are rotated upon each intermittent operation thereof can be very accurately controlled thereby making it possible to feed very accurate lengths of the strip material. The gradual acceleration and de-acceleration eliminates slippage between the driving mechanism and the stock, making the feeding of accurate lengths possible even though the major portion of the length of stock is moved at a high speed. This results in substantial savings since it is not necessary to feed more than the desired length of material and then cut off the excess, as is common in conventional intermittently operable strip feeding devices.

The foregoing and numerous other objects and advantages will become apparent and the invention will be more readily understood from the following detailed description, when read in conjunction with the appended drawings, wherein:

Fig. 1 is a plan view of a preferred embodiment of the invention;

Fig. 2 is a side elevational view taken substantially along the line 2—2 in Fig. 1;

Fig. 3 is a detailed plan view of the driving and driven elements;

Figure 15:
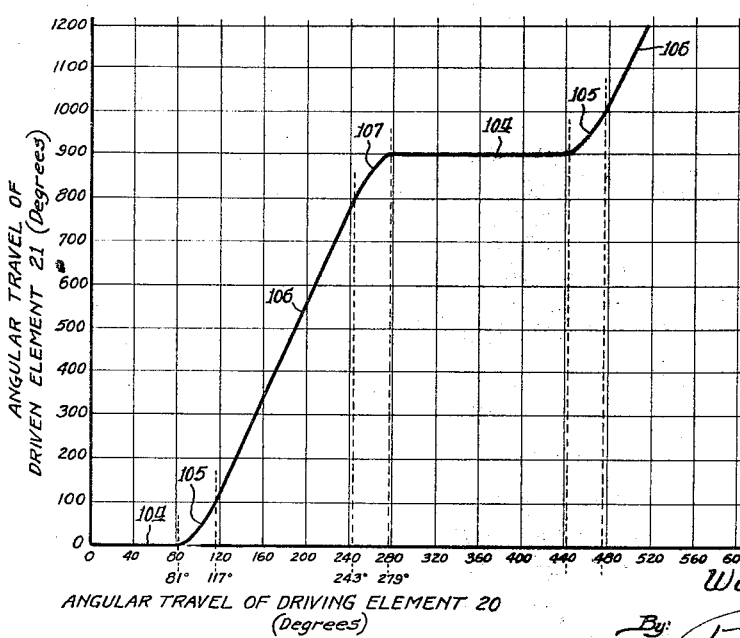

Figs 4, 5 and 6 together comprise an exploded view showing typical simultaneous relative positions of the different driving cams and their associated driven cam followers;

Figs. 7, 8 and 9 are fragmentary views showing typical relative positions of the cams and the cam followers during the accelerating portion of a cycle;

Figs. 10, 11, 12 and 13 are fragmentary views showing typical relative positions of the cams and their followers during the deaccelerating portion of a cycle;

Fig. 14 is a graph showing the change in angular velocity of the driven element during a typical constant-velocity revolution of the driving element;

Fig. 15 is a graph showing the angular travel of the driven element plotted against the angular travel of the driving element; and Fig. 16 is a view of a modified form of my invention.

Referring to the drawings, wherein like reference numerals in the different views have been utilized for identifying identical parts in all of the views, the invention comprises a driving element 20 and a driven element 21. The driving mechanism, including the driving and driven elements 20 and 21, is disposed within a suitable casing 22, which may be filled to any desired depth with a suitable lubricating fluid.

A suitable opening 23 (Fig. 2) is provided in the bottom of the casing 22 and disposed in this opening is a bushing 24. A power input driving shaft 25 is rotatably mounted within the bushing 24 by means of suitable ball bearings 26. The shaft 25 has a pinion 27 secured thereto and it is contemplated that the shaft 25 and pinion 27 may be driven continuously at a substantially constant speed.

An arm 28 is rigidly secured inside the casing 22 by means of a bolt 29 (Figs. 1 and 2) and the innermost end of the arm 28 is provided with an elongated aperture 30. Rotatably mounted on the upper end of the driving shaft 25 is a pivotally adjustable arm 31 held in place by means of the nut 32. The arm 31 has an opening 33 for receiving an idler gear shaft 34 which also extends through the elongated opening 30. A nut 35 on the upper end of the shaft 34 holds the shaft in a vertically stationary position. An idler gear 36 is rotatably mounted on the shaft 34 and is adapted to mesh with the gear 27.

A support member 37, rigidly secured to the inside of the casing 22, has a pair of pivotally mounted arms 38 which support the driving element 20. The arms 38 are provided with suitable internal openings for receiving bearings 39 and 40 for rotatably and substantially frictionlessly mounting a shaft 41. The shaft 41 is provided with an annular shoulder 42 and an abutment plate 43, having an opening therein for receiving the reduced end of the shaft 41, is bolted to the upper portion of the arm 38 for preventing upward movement of the shaft 41. The tapered bearings 39 prevent downward movement of the shaft 41.

The shaft 41 has a gear 44 secured thereto meshing with the idler gear 36. Thus, upon continued rotation of the input driving gear 27, the gear 44 and the shaft 41 are also continuously rotated. The shaft 41 also has a plurality of cams 45, 46 and 47, rotatable therewith, which will be described in greater detail hereinafter. Also secured to the shaft 41 is a gear sector 48.

The casing 22 has a pair of inwardly extending projections 49 and 50 for supporting the driven element 21 (Fig. 2). The driven element 21 comprises a shaft 51 rotatably disposed in suitable openings in the projections 49 and 50 and has a gear 52 secured to the shaft which meshes intermittently with teeth formed on the gear sector 48. The driven element 21 also includes a plurality of annular plates 53, 54, 55 and 56 secured to the shaft 51 for respectively mounting cam follower members 57, 58 and 59. The cam follower members 57, 58 and 59 cooperate respectively with the cams 47, 46 and 45. Secured to the upper end of the shaft 51 is a pinion 60. A plate 61, provided with suitable openings at opposite ends thereof for receiving the shafts 41 and 51, functions to lock the driving and driven elements 20 and 21 in fixed spaced relation to each other.

A shaft 62 is rotatably mounted in openings 63 and 64 respectively formed in the projection 50 and in an upper inwardly extending projection 65. Secured to the shaft 62 is a pinion 66 which meshes with the pinion 60. The shaft 62 also carries a gear 67 and a driving roller 68. The gear 67 meshes with a gear (not shown) secured to a shaft 69 (Fig. 1) which drives a second roller 70. When the two rollers 68 and 70 are driven in the direction indicated by the arrows, they may be utilized for advancing strip material, as for example, the thin louver wires used in making screens with a weaving machine of the type shown in the aforementioned Ewing patent.

Referring now to Figs. 3, 4, 5 and 6 in particular, a more detailed description of the driving and driven elements 20 and 21 will be given. As was stated heretofore, the driving element 20 includes three cams 45, 46 and 47. These three cams are rotatable as a unit, each of them being connected to the shaft 41 and each of them having locating pins 71 extending therethrough to insure angular coordination and provide rigidity for the unit. The cam 45, the upper cam in Figs. 2 and 3, is provided with a dwell sector 72 having a substantially constant radius of curvature. Proceeding clockwise around the cam 45, the dwell sector 72 merges with a surface 73 on an apex 74 of this cam, the surface 73 being formed with a gentle radially outwardly extending slope. Proceeding further around the cam 45, in a clockwise direction, the periphery of the cam drops off to provide a sector 75 having a substantially constant radius of curvature, which radius is less than the radius of the dwell sector 72. The sector 75 permits the driven element 21 to rotate under the influence of the gear section 48 without interference from the cam surfaces of the driving element 20.

The peripheral surface of the cam 45 between the apex 74 and the sector 75 is shown by Fig. 3 to start with an inwardly curved portion 140 followed by an abrupt drop forming a radiused pocket 141 designed to seat one of the hereinafter described cam followers. The sector 75 terminates in a second apex 76 having a side 77 formed with a relatively steep slope terminating in a pocket 78. The slope of that side of the apex 76 connecting the apex 76 to the sector 75 has a gradual head-in portion 77a followed by a sharply inclined surface 77b. The crown portion of the apex 76 is a smooth curve of substantial radius. A gradually sloped surface 79 connects the pocket 78 with the dwell sector 72.

The intermediate cam 46 is provided with two sectors 80 and 81, each of which is formed with substantially the same radius of curvature, which sectors permit the driven element 21 to rotate without interference from the cam portions of the driving element 20. The sectors 80 and 81 are separated by apices 82 and 83, respectively provided with surfaces 84 and 85 having the same slope. This slope is somewhat steeper than the slope of the surface 73 on the apex 74 of cam 45 and somewhat less steep than the slope of the surface 77 on the apex 76 of cam 45. The crowns of the apices 82 and 83 are each relatively narrow and sharp, only the extreme tip being rounded.

The cam 47 (Fig. 6) is substantially a duplicate of the cam 45 (Fig. 4), except that it is mounted symmetrically reversely with respect to the cam 45. The cam 47 is provided with a sector 86 having constant radii of curvature substantially equal to the radius of curvature of the sector 72 and with a sector 87 which has a constant radius of curvature substantially equal to the radius of curvature of the sector 75 of the cam 45. The cam 47 is provided with an apex 88 having a surface 89 formed with the same slope as the surface 77, and surfaces 89a and 89b having the same slope as the surfaces 77a and 77b of the cam 45. The surface 89 terminates in a pocket 90 corresponding to the pocket 78, on the cam 45. The pocket 90 is connected with the sector 86 by a surface 91 having the same slope and curvature as the surface 79 on the cam 45. The cam 47 is also provided with a second apex 92 having a gently sloping surface 93 which merges with the sector 86. The surface 92 has the same slope as the slope of the surface 73 on the cam 45.

It will be noted that the cam followers 57, 58 and 59 of the driven element 21 comprise pairs of rollers which planetate about the shaft 51, and that the cam followers in each pair are located diametrically opposite each other. The rollers 59 cooperate with the first or upper cam 45, the rollers 58 cooperate with the second or intermediate cam 46 and the rollers 57 cooperate with the third or lower cam 47. The axes of rotation of the driving element 20 and the driven element 21 are disposed parallel to each other and the distance between these axes is such as will cause one of the rollers 59 to engage the cylindrical sector 72 of the cam 45 at the same time as one of the rollers 57 engages the similar cylindrical sector 86 on the cam 47. Accordingly, when the driving element 20 rotates through that portion of each revolution thereof which brings the surfaces 72 and 86 into engagement with the cams 59 and 57 respectively, the driven element 21 is locked against rotation.

Considering the rotation of the driving element 20 to be counterclockwise, the apices 74, 82 and 88 function to uniformly accelerate the driven element 21 in a clockwise direction as illustrated in Figs. 7, 8 and 9. When the driving element 20 advances to a point such that the surface 73 starts to engage one of the rollers 59, the inwardly sloping surface 91 on the cam 47 will have advanced sufficiently to receive the roller 57. The slope of the surface 73 gradually increases and the slope of the surface 91 gradually decreases so that continued constant rotation of the driving element 20 causes a uniform acceleration of the driven element 21 until the peak of the apex 74 reaches the roller 59. At this time the roller 58 will have planetated clockwise with the driven element 21 and will be engaged by the more sharply sloped surface 84 on the apex 82 of the cam 80. Continued rotation of the driving element 20 causes the surface 84 to act upon the roller 58 thereby further accelerating the driven element 21. At this time the continued drop of the surface 91 permits the roller 57 to enter the pocket 90 as the roller 58 climbs the surface 84. When the roller 58 reaches the peak of the apex 82, the roller 57 is in a position to start climbing the sharply sloped surface 89 on the apex 88 during continued advance of the driving member 20 in a counterclockwise direction. When the roller 57 has climbed the surface 89 approximately to the point where the curvature thereof changes from concave to convex, the driven element 21 will have been uniformly accelerated to its maximum rotational velocity and precisely at this time the first tooth on the gear sector 48 carried by the driving element 20 will engage the gear 52 on the driven element 21. Continued rotation of the driving element 20 in a counterclockwise direction causes rotation of the driven element 21 in a clockwise direction at a constant driving ratio for so long as the gear sector 48 meshes with the gear 52.

The apices serve an important purpose other than acceleration and retardation. They accurately position the driven element 21. This accuracy is such that they always align the teeth of the gear 52 with the teeth of the gear sector 48. This insures perfect meshing as the gears enter into engagement, an absolutely essential function to permit high speed operation without excessive wear on the parts. The last portion of operation of the apices rotates the driven element at a constant velocity. It is during this period that the gear sector 48 and the gear 52 engage.

Each apex controls the approaching one of a pair of rollers with one slope and the receding mate with the other. This is true whether the driving element is effecting acceleration or retardment of the driven element. This assures positive location of the driven element since it eliminates backlash. The operation of the device may be stopped at any point in its cycle without affecting accuracy of its coordination between the driving and driven elements. The shape of each slope is controlled by the path of the point of tangency between the rollers and the cam surface in view of the velocity of the driven element with respect to that of the driving element. The number of roller stations is controlled by the character of the motion it is desired to produce in the driven element.

Referring now to Figs. 10 through 13, that portion of the cycle of operation during which the driven element 21 is retarded from its maximum rotational velocity down to a stationary condition will be described. When the point in the cycle of rotation is reached where the gear sector 48 is about to disengage from the gear 52 one of the rollers 59 will have planetated to the position shown in Fig. 10 where it commences to engage the surface 77 on the apex 76 of the cam 45. The driven element 21 is urged to continue its clockwise rotation both by momentum and by the forward sides of the apices. Thus, the position of the driven element 21 is never a matter of chance and its control is not dependent upon momentum. The driven element 21 is thus urged to continue its clockwise rotation and the roller 59 to engage the surface 77. However, due to the slope of the surface 77 the driven element 21 is uniformly retarded until the roller 59 reaches the pocket 78. At this time the roller 58 will have planetated to the position shown in Fig. 11 where it engages the outer end of the surface 85. The driven element then continues to rotate with the roller 58 following the less steep surface 85 and the roller 59 following the surface 79 on the cam 45. This condition prevails until the rollers 58 and 59 reach the relative positions shown in Fig. 12, the driven element being uniformly retarded all of this time. At this point in the cycle the roller 57 will have reached the outer end of the surface 93 formed on the apex 92 of the cam 47. The surfaces 93 and 79 will then, by cooperation with the rollers 59 and 57, continue to de-accelerate the driven element 21. During this last stage, the surface 79 acts to force the roller 59 slowly clockwise, if such is necessary.

Figure 10:
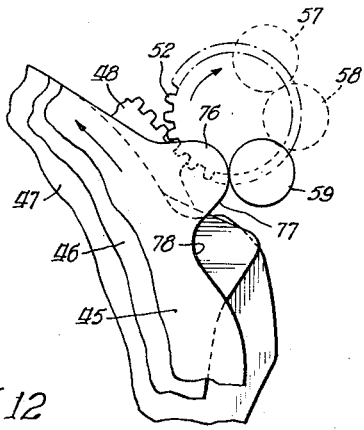
Figure 11:
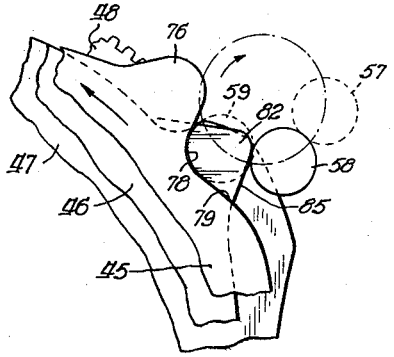
Figure 12:
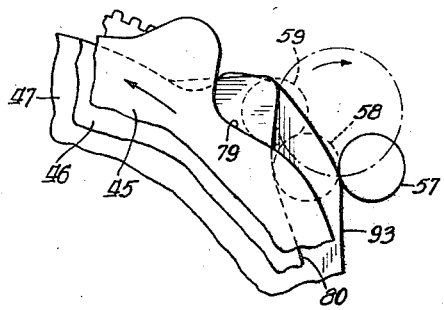
Figure 13:
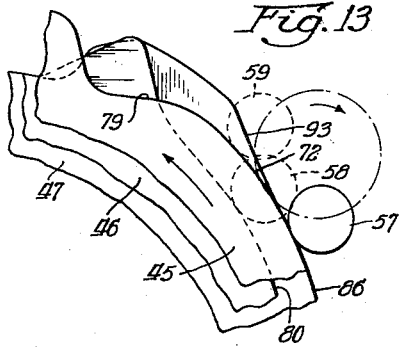

At the point in each revolution of the driving element 20 where the rollers 59 and 57 respectively engage the surfaces 79 and 93, the roller 58 will have reached the sector 80 of the cam 46 and will therefore be disengaged from this cam. Continued counterclockise rotation of the driving element 21 causes the roller 59 to climb the surface 79 and the roller 57 to follow the surface 93 until the rollers reach the relative positions shown in Fig. 13. In Fig. 13 the rollers 59 and 57 are shown as being in engagement respectively with the concentric sectors 72 and 86, which both have the same constant radius of curvature. The driven element is therefore stopped, the surface 72 preventing it from rotating in a counterclockwise direction and the surface 86 preventing it from rotating in a clockwise direction. Thus, as the driving element 20 continues to rotate in a counterclockwise direction, the driven element 21 is locked against rotation until the rollers 59 and 57 again commence to climb and recede respectively on surfaces 73 and 91.

Due to the fact that the driven element 21 is positively locked against rotation for a predetermined interval of each cycle of rotation of the driving element 20, the driven element 21 is alternately advanced a predetermined angular distance and held stationary for a predetermined interval. Also, during the portion of each revolution of the driven element 21 when the gear sector 48 drives the driven element, the angular velocity of the driven element is substantially constant if the driving element 20 is driven at a constant angular velocity. Accordingly, the present invention provides a very satisfactory device for controlling the rotation of the feed rollers 68 and 70 which may be used to advance any strip material into an apparatus such as a screen weaving machine.

Reference will now be made to Figs. 14 and 15 which respectively show the angular velocity of the driven element 21 when the driving element 20 rotates at a speed of 120 R. P. M., and the angular travel of the driven element plotted against the angular travel of the driving element. My invention as previously described is designed to provide uniform acceleration. The curve shown in Fig. 14 shows, for the driven element 21, the periods of positive and negative uniform acceleration together with the periods of rest and uniform peak velocity. It is comprised of a portion 100 representing the velocity during the portion of each revolution of the driving element 20 when one of each of the rollers 57 and 59 respectively engage the portions 86 and 72 of the cams 47 and 45. Another portion 101 of the velocity curve represents the velocity of the driven element when the accelerating cam surfaces 73, 84 and 89 respectively cooperate with cam follower rollers 59, 58 and 57 in order to accelerate the driven element from an angular velocity of zero radians per second up to the maximum angular velocity thereof. A portion 102 of the velocity curve represents the velocity of the driven element 21 while the gear 52 thereon is in meshing engagement with the gear sector 48 on the driving element 20. A portion 103 of the velocity curve represents the velocity of the driven element 21 while the retarding cam surfaces 77, 85 and 93 respectively cooperate with follower rollers 59, 58 and 57 in order to deaccelerate the driven element from its maximum angular velocity indicated by the portion 102 of the curve to its non-rotating or rest period indicated by the portion 100 of the curve. Due to the fact that the accelerating and retarding portions 101 and 103 of the velocity curve are straight lines, showing that the acceleration and retardment are uniform, there are no abrupt stops and starts of the driven element 21 and accordingly undesirable effects resulting from abrupt velocity changes of the driven element 21 are reduced to a minimum.

Turning now to Fig. 15, showing the angular travel of the driven element 21 plotted against the angular travel of the driving element 20, it is apparent that the driven element is sequentially held stationary, gradually accelerated until its velocity reaches a maximum, driven at the maximum velocity for a predetermined interval (the driving ratio between the elements being constant during this interval), and gradually retarded from the maximum to a stationary condition. The portions 104 of the curve shown in Fig. 15 represent the intervals when the driven element 21 is held stationary, the portions 105 represent the intervals when the driven element is being accelerated, the portions 106 represent the intervals when the driven element is being driven at a constant driving ratio with respect to the driving element and the portion 107 represents an interval when the driven element is being retarded.

It is contemplated that numerous changes and modifications may be made in the present invention without departing from the basic principles disclosed herein. For example, in applications where it is desired that the driven element be driven for a lesser or greater interval in proportion to the interval when it is held stationary, it is only necessary that the accelerating and retarding groups of apices of the driving element cams be located closer together or farther apart with a corresponding shortening or lengthening of the gear sector carried by the driving element. If it is desired that the acceleration rate be increased or reduced, or that it be non-uniform in character, it is only necessary to appropriately modify the active slopes of the various apices. More or fewer apices, cams, and cam followers may be employed, depending on the character of motion desired for the driven member. It is further contemplated that the accelerating and retarding groups of apices may be disposed adjacent to each other, thereby eliminating the gear sector so that the driven element merely accelerates to a maximum angular velocity and immediately thereafter, de-accelerates to a stationary condition. It is also contemplated that the gear sector on the driving element may be replaced by additional apices and depressions of uniform design on the driving element cams, disposed between the accelerating and decelerating apices, for cooperating with the followers on the driven element in much the same manner as the driving element gear sector cooperates with the driven element gear.

If it should be desired to substantially increase the maximum angular velocity ratio of the driven member to the driving member, it is necessary to increase the diameter of the circular base line of the driving cams, this line being considered as the clearance line between the cams and the planetating cam followers. This is also the line on which the apices are based.

I have also found that it is possible to effect rotation of the driven element in the opopsite direction from that heretofore described, that is, with both driving and driven elements rotated clockwise or counterclockwise simultaneously. This may be accomplished as is illustrated in Figure 16 wherein a number of cams 142, 142a, 142b and 142c are used each having an appropriately designed sloping surface which, upon rotation of the cam assembly, will contact one of the rollers on the driven element 144 and will force the roller oppositely to the direction of travel normal in the sense of meshing gears. Each of the rollers 143, 143a, 143b and 143c are designed to contact a different one of the cams 142, 142a, 142b and 142c on the driving element 145. It will be recognized that a greater number of cams and rollers will be necessary to effect reverse rotation of the driven element that to attain an equal velocity in a forward direction. This is due to the fact that a given apex on a cam, while acting upon one of a pair of cam followers, is approaching the other one of the pair instead of receding from it. Thus, in order to avoid interference from the second cam follower as it approaches the cam, and before it is in position to be properly acted upon, the apex must have a shorter sector of active cam surface and must yield the drive at an earlier time to the successive apex and cam follower which will continue the action. In some cases it will be necessary to have a single planetating cam follower, instead of a pair, to cooperate with each cam. In such a case an eight stage driven member like that of Fig. 16 would require eight cams in the driving assembly.

The use of cams for effecting reverse rotation of the driven element may be combined with the structure for effecting forward rotation in a single driving and driven couple. Thus, the driven element may be driven forwardly a given number of full or fractional revolutions, rendered stationary, reversed a given number of full or fractional revolutions and rendered stationary all in a single revolution of the driving element. Additional periods of dwell or forward or reverse rotation may be introduced. No other arrangement is capable of accomplishing this without either reversing the direction of the driving element or utilizing a pair of alternately operable driving elements rotating in opposite directions.

It will be understood that the present disclosure shows only one preferred form of the invention and it is contemplated that in addition to the modifications and changes set forth above numerous other changes and modifications may be made without departing from the principles or spirit of the invention.

What is claimed is:

1. In a device for converting rotary motion to intermittent rotary motion, the combination of rotatable input and output elements, means for constantly rotating said input element, intermittently cooperable means on said elements for establishing an intermittent constant driving ratio between said elements, a plurality of accelerating cams on said input element successively cooperable with said follower and effective just prior to the establishment of said constant driving ratio between said elements for gradually accelerating said output element from a stopped condition up to the constant driving ratio speed thereof, and a plurality of decelerating cams on said input element successively cooperable with said follower means and effective upon the disestablishment of the constant driving ratio between said shafts for gradually decelerating said output element from the constant driving ratio speed down to a stopped condition thereof.

2. In a motion transmitting device, the combination of rotatable drive and driven elements, means for continuously rotating said drive element, means disposed on said elements and intermittently operable to establish a drive between said elements to thereby effect intermittent rotation of said driven element, a pair of axially spaced cams carried by said drive element, and a pair of axially spaced followers carried by said driven element cooperable respectively with said cams, said followers being angularly spaced from each other and said cams having angularly overlapping portions formed with substantially constant radii of curvature, said angularly overlapping portions of said cams being cooperable with said followers alternately with respect to the operation of said drive establishing means for locking the driven element against rotation for a predetermined portion of each revolution of said drive element.

3. In a motion transmitting device, the combination of rotatable drive and driven elements, means for continuously rotating said drive element, means disposed on said elements and intermittently operable to establish a drive between said elements to thereby effect intermittent rotation of said driven element, a pair of axially spaced cams carried by said drive element, and a pair of axially spaced followers carried by said driven element cooperable effectively with said cams, said followers being angularly displaced from each other and said cams having angularly overlapping portions formed with substantially constant radii of curvature, said angularly overlapping portions of said cams being cooperable with said followers alternately with respect to the operation of said drive establishing means for locking the driven element against rotation for a predetermined portion of each revolution of said drive element.

4. In a motion transmitting device, the combination of a driving element adapted to be rotated continuously in the same direction, a rotatable driven element, said driving element comprising a plurality of axially spaced cams and a gear sector, said driven element comprising a plurality of axially spaced cam followers and a gear, said cams having angularly spaced accelerating and decelerating apices respectively cooperable with the cam followers upon rotation of the driving element for respectively gradually accelerating and decelerating said driven element between a stationary condition and a predetermined angular velocity, said gear sector being angularly disposed between said accelerating and decelerating apices and engageable with said gear for driving the driven element at said predetermined constant angular velocity, said accelerating and decelerating apices and said gear sector together comprising an angularly extending driving portion of said driving element which functions during each revolution thereof to alternately drive said driven element through a predetermined angle and stop the driven element.

5. A motion transmitting device in accordance with claim 4 wherein a pair of said cams are formed with portions extending angularly between said accelerating and decelerating apices and diametrically opposed to the gear sector, which portions have constant radii of curvature and engage the respective pair of said cam followers for holding the driven element stationarily locked for a predetermined portion of each revolution of the driving element.

6. A motion transmitting mechanism comprising a driving member adapted to be rotated continuously, a driven member having a plurality of axially and angularly spaced planetary elements, said driving member having a plurality of axially spaced cams respectively cooperable with different ones of said planetary elements, and angularly spaced apices respectively provided on said cams and successive ones of said apices having progressively increasing slopes, whereby the apices cooperate successively with corresponding ones of said planetary elements during rotation of said driving member to gradually accelerate said driven member.

7. A motion transmitting mechanism comprising a driving member adapted to be rotated continuously, a driven member having a plurality of axially and angularly spaced planetary elements, said driving member having a plurality of axially spaced cams respectively cooperable with different ones of said planetary elements, said cams being formed with overlapping portions having constant radii of curvature, the overlapping portions on a pair of said cams being engageable with a corresponding pair of angularly spaced planetary elements to lock said driven member against rotation during a portion of each revolution of said driving member, and angularly spaced apices respectively provided on said cams with successive ones of said apices having progressively increasing slopes, whereby the apices cooperate successively with corresponding ones of said planetary elements during rotation of said driving element to gradually accelerate said driven member.

8. A motion transmitting mechanism comprising a driving member adapted to be rotated continuously, a driven member having a plurality of axially and angularly spaced planetary elements, said driving member having a plurality of axially spaced cams respectively cooperable with different ones of said planetary elements, and angularly spaced apices respectively provided on said cams with successive ones of said apices having progressively decreasing slopes, whereby the apices cooperate successively with corresponding ones of said planetary elements during continued rotation of said driving member to gradually decelerate said driven member to a stationary condition.

9. In motion transmitting mechanism, the combination of a driving member adapted to be rotated continuously, a driven member having a plurality of axially and angularly spaced planetary elements, said driving member having a plurality of axially spaced cams respectively cooperable with different ones of said planetary elements, said cams being formed with overlapping portions having constant radii of curvature, the overlapping portions on a pair of said cams being engageable with a corresponding pair of said angularly spaced planetary elements to lock said driven member against rotation during a portion of each revolution of said driving member, and angularly spaced apices respectively provided on said cams with successive ones of said apices having progressively decreasing slopes, whereby the apices cooperate successively with corresponding ones of said planetary elements during continued rotation of said driving member to gradually decelerate said driven member to a stationary condition.

10. In a motion transmitting device, the combination of driving and driven elements, said driving element being adapted to be rotated continuously and comprising a plurality of axially spaced cams, each of the accelerating apices being angularly spaced from each other and having progressively increasing slopes, each of the decelerating apices being angularly spaced from each other and having progressively decreasing slopes, said driven element comprising a plurality of axially and angularly displaced planetary follower elements for respectively cooperating with said cams, whereby the accelerating apices cooperate successively with the corresponding follower elements to gradually accelerate the driven member and the decelerating apices cooperate successively with the corresponding follower elements to gradually decelerate the driven element during the continuous rotation of the driving element.

11. In a motion translating mechanism adapted to convert continuous rotary motion into intermittent rotary motion, and having a continuously rotated driving member and an intermittently rotated driven member, said mechanism in combination comprising: said driving member having a plurality of axially spaced cams, each of said cams having angularly spaced apices thereon; said apices arranged in an acceleration group and a deceleration group, said groups being angularly spaced; the apex on each cam in each group having a different angle of inclination; the apices in said acceleration group arranged in order of increasing inclination away from the direction of rotation; the apices in said deceleration group being arranged in order of decreasing inclination away from the direction of rotation; a plurality of planetary followers on said driven member adapted to be planetated by said apices; a gear segment on said driving member extending angularly between said acceleration group and deceleration group; a gear on said driven member adapted to engage said gear section.

12. In a motion translating mechanism adapted to convert continuous rotary motion into intermittent rotary motion, and having a continuously rotated driving member and an intermittently rotated driven member, said mechanism in combination comprising: said driving member having a plurality of axially spaced cams, each of said cams having angularly spaced apices thereon; said apices arranged in an acceleration group and a deceleration group, said groups being angularly spaced; the apex on each cam in each group having a different angle of inclination; the apices in said acceleration group arranged in order of increasing inclination away from the direction of rotation; the apices in said deceleration group arranged in order of decreasing inclination away from the direction of rotation; a plurality of planetary followers on said driven member adapted to be planetated by said apices; a gear segment on said driven member extending angularly between said acceleration group and deceleration group; a gear on said driven member adapted to engage said gear section; a segmental surface on said cams extending between said deceleration group and acceleration group and diametrically positioned with respect to said gear segment; said segmental surface adapted to engage a pair of said followers and hold said driven member stationary.

13. In a motion translating mechanism adapted to convert continuous rotary motion of constant angular velocity into rotary motion of variable angular velocity, and having a continuously rotating driving member and an intermittently rotated driven member, said mechanism in combination comprising: said driving member having a plurality of axially spaced cams, each of said cams having angularly spaced apices thereon; said apices arranged in an acceleration group and a deceleration group, said groups being angularly spaced; the apex on each cam in each group having a different angle of inclination; the apices in said acceleration group arranged in order of increasing inclination away from the direction of rotation; the apices in said deceleration group being arranged in order of decreasing inclination away from the direction of rotation; a plurality of planetary followers on said driven member adapted to be planetated by said apices; a gear segment on said driving member extending angularly between said acceleration group and deceleration group; a gear on said driven member adapted to engage said gear section.

14. In a motion transmitting device, the combination of a constant velocity continuously rotated driving element and a rotatable driven element; segmental means on said driving element for driving said driven element at a constant velocity; a first plurality of cam means on said driving element at one end of said segmental means for accelerating said driven element to said constant velocity; a second plurality of cam means on said driven element at the other end of said segmental means for decelerating said driven element from said constant velocity.

15. In a motion transmitting device, the combination of a constant velocity continuously rotated driving element and a rotatable driven element; segmental means on said driving element for driving said driven element at a constant velocity; a first plurality of cam means on said driving element at one end of said segmental means for accelerating said driven element to said constant velocity; a second plurality of cam means on said driven element at the other end of said segmental means for decelerating said driven element from said constant velocity; cam segments of constant radius on said driving element for holding said driven element stationary; said cam segments being between said first plurality of cam means and said second plurality of cam means and angularly spaced from said segmental means.

References Cited in the file of this patent

UNITED STATES PATENTS

| | | |
|---|---|---|
| 498,552 | Hunt | May 30, 1893 |
| 2,027,818 | Golber | Jan. 14, 1936 |
| 2,253,270 | Golber | Aug. 19, 1941 |
| 2,254,766 | Andren | Sept. 2, 1941 |
| 2,464,959 | Andren | Mar. 22, 1949 |

FOREIGN PATENTS

| | | |
|---|---|---|
| 82,598 | Germany | Aug. 8, 1895 |
| 790,174 | France | Sept. 2, 1935 |
| 956,755 | France | Aug. 15, 1949 |